United States Patent [19]

Berkhoel

[11] 4,209,310

[45] Jun. 24, 1980

[54] FILTER ELEMENT MOUNTING MECHANISM

[75] Inventor: James L. Berkhoel, St. Paul Park, Minn.

[73] Assignee: Donaldson Company, Inc., Mineapolis, Minn.

[21] Appl. No.: 948,745

[22] Filed: Oct. 5, 1978

Related U.S. Application Data

[60] Division of Ser. No. 847,255, Oct. 31, 1977, which is a continuation of Ser. No. 599,787, Jul. 28, 1975, abandoned, which is a continuation-in-part of Ser. No. 486,215, Jul. 5, 1974, abandoned.

[51] Int. Cl.² .................. B01D 27/06; B01D 46/04
[52] U.S. Cl. ............................. 55/273; 55/284; 55/302; 55/484; 55/498; 55/499; 55/502; 55/505; 55/510; 55/521

[58] Field of Search .......... 55/273, 284, 302, 350, 55/484, 498, 499, 502, 504–505, 508, 510, 521, 497; 210/333 R, 333 A, 411, 448, 452, 459, 484, 487, 493 R, 493 B, 497 R

[56] References Cited

U.S. PATENT DOCUMENTS

| 2,214,737 | 9/1940 | Dauphinee ............................. 55/350 |
| 3,078,650 | 2/1963 | Anderson et al. ................. 55/510 X |
| 3,201,927 | 8/1965 | Wachter ............................. 55/510 X |
| 3,332,217 | 7/1967 | Rymer ............................... 55/350 X |
| 3,382,651 | 5/1968 | Hahl et al. ......................... 55/508 X |
| 3,508,383 | 4/1970 | Humbert, Jr. et al. ............ 55/502 X |

FOREIGN PATENT DOCUMENTS

| 326047 | 3/1930 | United Kingdom ...................... 55/508 |
| 1220174 | 1/1971 | United Kingdom ...................... 55/510 |

*Primary Examiner*—Kathleen J. Prunner
*Attorney, Agent, or Firm*—Merchant, Gould, Smith, Edell, Welter & Schmidt

[57] ABSTRACT

A novel arrangement for mounting the filter elements of an air filter in a manner which facilitates their removal and replacement without tools or accessories.

11 Claims, 5 Drawing Figures

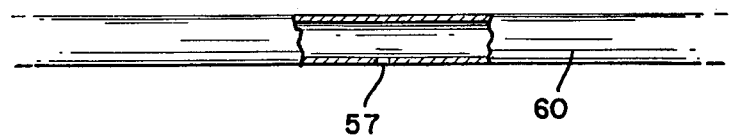
FIG. 4
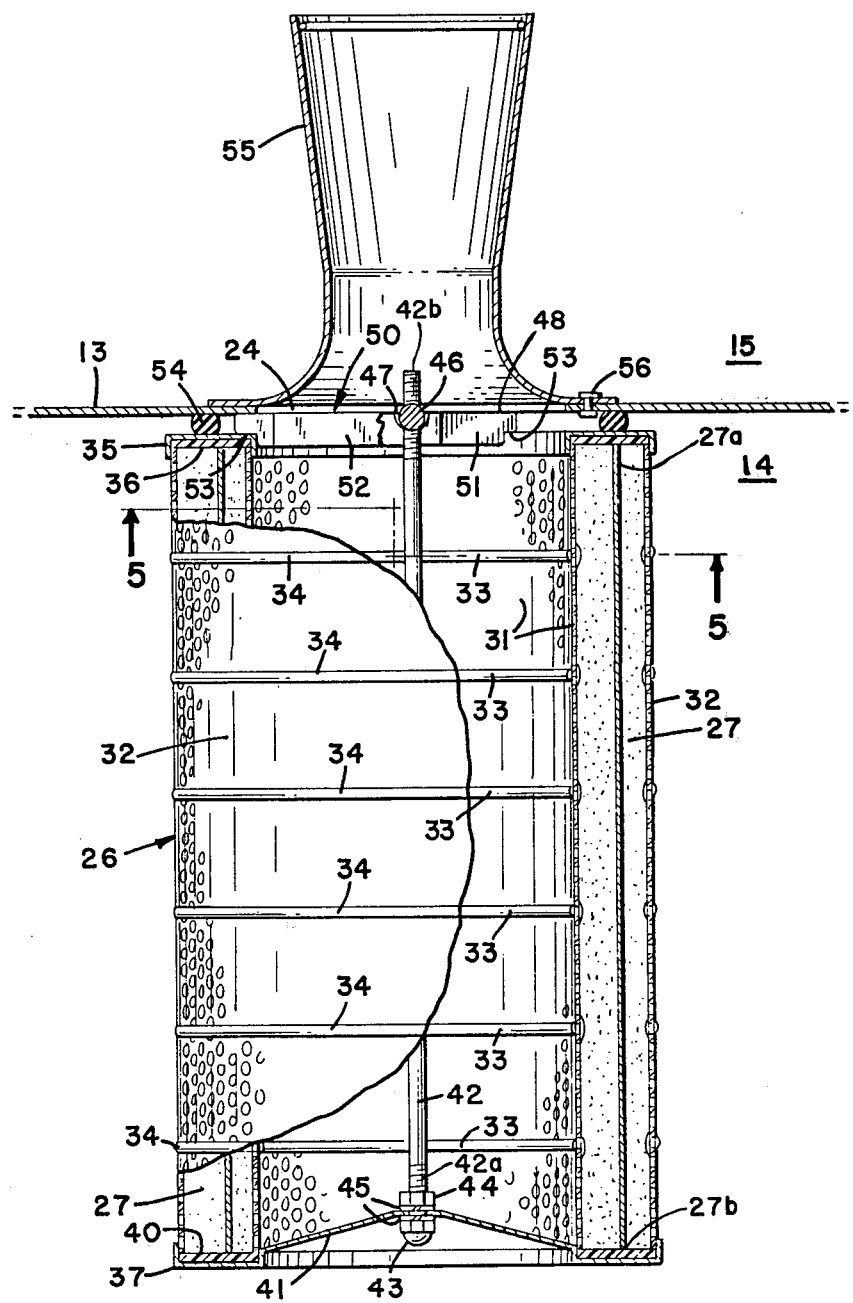

FILTER ELEMENT MOUNTING MECHANISM

This application is a division of Ser. No. 847,255, filed Oct. 31, 1977, originally filed in the name of Robert E. Frey and James L. Berkhoel, jointly, and later converted to the name of Robert E. Frey as sole inventor. That application was a continuation of Ser. No. 599,787, filed July 28, 1975, now abandoned, which was a continuation-in-part of Ser. No. 486,215, filed July 5, 1974, now abandoned.

BACKGROUND OF THE INVENTION

The current interest in avoidance of air pollution has in a sense only emphasized an ongoing trend to prevent massive discharge of particular matter, often of commercial value, into the ambient atmosphere. Air filters of many types are known, more or less specially adapted for widely varying uses.

There are numerous situations where a large volume of a fluid such as air must be treated on a continuous basis. In order to handle several thousand cubic feet per minute a large filter area must be available, and even then a very considerable pressure drop takes place across the filter. From a practical viewpoint it is necessary that some form of continuous cleaning of the filter medium be provided, as duplication of equipment to permit shutdown for cleaning is prohibitively expensive both in cost and in space, while the period of operation of a filter unit before its capacity is reduced to an intolerable level by the matter accumulated thereon is not long.

A standard way of constructing air filters has been to provide a housing divided into inlet and clean air chambers by a partition having a plurality of apertures. A sock or bag of suitable fabric, often on a wire frame, is suspended in each aperture, and a suitable pump or blower causes the air flow through the apertures, so that the undesired particulate matter collects on the outer surfaces of the bags. Cleaning is accomplished by directing brief jets of air into the bags, a few at a time, in a predetermined sequence, thus reversing the flow through the bags and subjecting them to a minor physical shaking. This removes the deposited material, most of which falls to the bottom of the inlet chamber for removal either intermittently or continuously with a rotary air lock.

In a typical example, a filter of this sort to handle approximately 8,000 cubic feet of air per minute with an identified pollutant was made up of 81 bags four and one-half inches in diameter and eight feet long, with the total filtering area about 780 square feet. Thus even apart from the continuous cleaning components, the filter elements alone occupy a housing of very considerable size.

Efforts have been made to find substitutes for filter bags and some of these alternatives have been successful to a limited extent in laboratory situations. Thus porous metal and ceramic media turned out to have too low a capacity, and woven metal media are prohibitively expensive. Pleated filters made of paper gave some progress, but heretofore have had too short a life time to be practical. Such elements were developed for the entirely different field of protecting the engines of motor vehicles such as trucks and off-the-road vehicles from road dust and other particulate matter, and accordingly are of suitably rugged construction for that purpose. In their intended use, however, they were not subject to rigors of reverse jet cleaning, but were simply replaced and discarded as became necessary.

SUMMARY OF THE INVENTION

It is the discovery of this invention that these pleated paper filters, when sufficiently derated, are comparable to cloth bags in volume of air handled, can withstand the stresses of continuous cleaning by reverse jets, and reduce markedly the total size of a filter unit, often by a factor of two. Sixteen of such elements present 3060 square feet of filtering surface, fit in a housing of substantially no greater transverse dimension than that previously described, with a height of twenty-eight inches rather than eight feet, and replace the eighty-one bags mentioned above. The pleated paper filters are also less expensive than the cloth bags. The invention also includes novel means for mounting said pleated paper filters in readily replacable fashion.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing,

FIG. 4 is a fragmentary sectional view taken along the axis of a filter element.

DESCRIPTION OF THE PREFERRED EMBODIMENT

Figure 1:
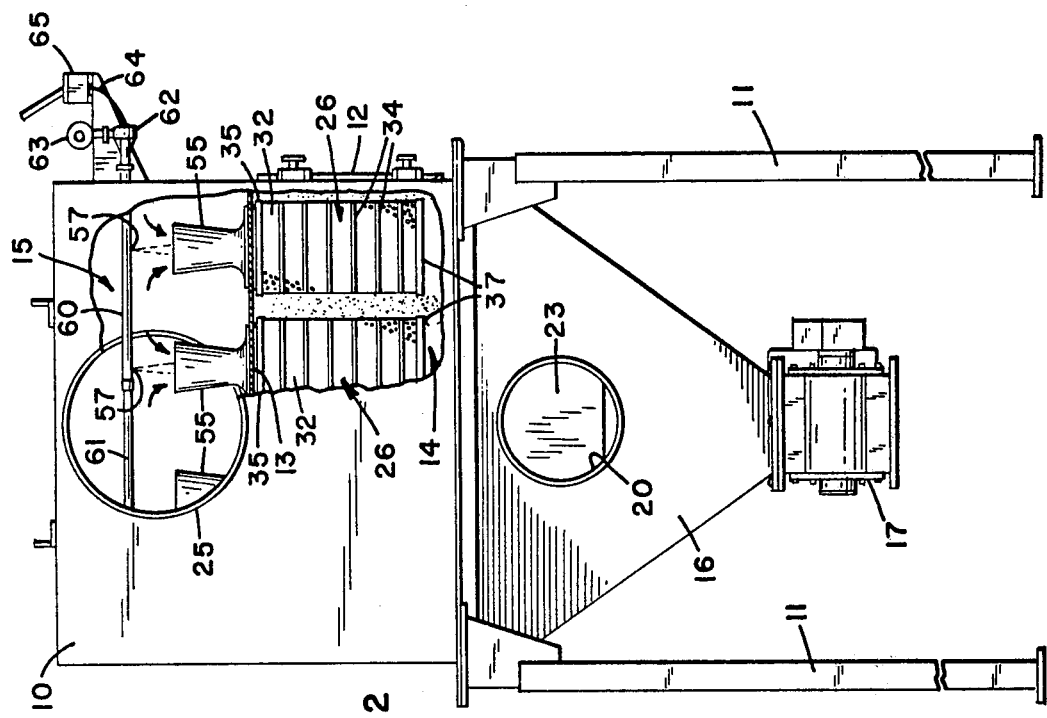
FIG. 1 is a front elevational view of an air filter embodying the invention, parts being broken away for clarity.

Before going into a detailed description of the invention as illustrated in the drawing, the meaning of the term "derating" will be specifically stated. In any filter design problem the volume of air to be filtered per unit time is a known quantity. The effective porosity of the filter medium being considered, in operation on gas contaminated with a known pollutant, is determined, somewhat pragmatically, by the nature, fineness, and concentration of the contaminants, the temperature of the air passing through the filter, and any characteristic peculiar to the specific application. The porosity being known, it becomes possible to determine the area of medium required to pass the necessary volume of air. The quotient of air volume, in cubic feet per minute, divided by the filter area, in square feet, is the filter "rating", or rated velocity, in feet per minute. The rating not only has the dimensions of velocity, but is in fact a measure of the speed of air passing through the filter.

"Derating" a filter is simply operating it at less than its normal rated velocity. Practically this means using more filter area than is required by the computation given above, since the total air volume cannot be reduced. A numerical example may be instructive. Suppose it is necessary to filter 900 cubic feet of air per minute through a medium of such porosity that 100 square feet of filter area is necessary: the filter rating and the speed of air through the filter are 9 fpm. If now the filter area is increased to 125 square feet, the functional filter rating is now 7.2 fpm so that the filter has been derated by a factor of 1.8 over 9, or 0.2, and the speed of air through the filter is reduced to eight tenths of its former value.

It is known that derating filters by factors of this order of magnitude improves the operation of the filters for the removal of pollutants from the air, and also tends to give some improvement in filter life, on the basis that any component tends to longer life under lighter loading.

In the preferred embodiment of the present invention, however, the pleated filter elements are grossly derated. In this system, wherein the pleated filters are repeatedly cleaned by reverse jets of air, a plurality of pleated filter elements are installed having a total filter area sufficient to reduce the velocity of air flow through each filter element to approximately one-quarter of the rated velocity of the filter element.

Figure 2:
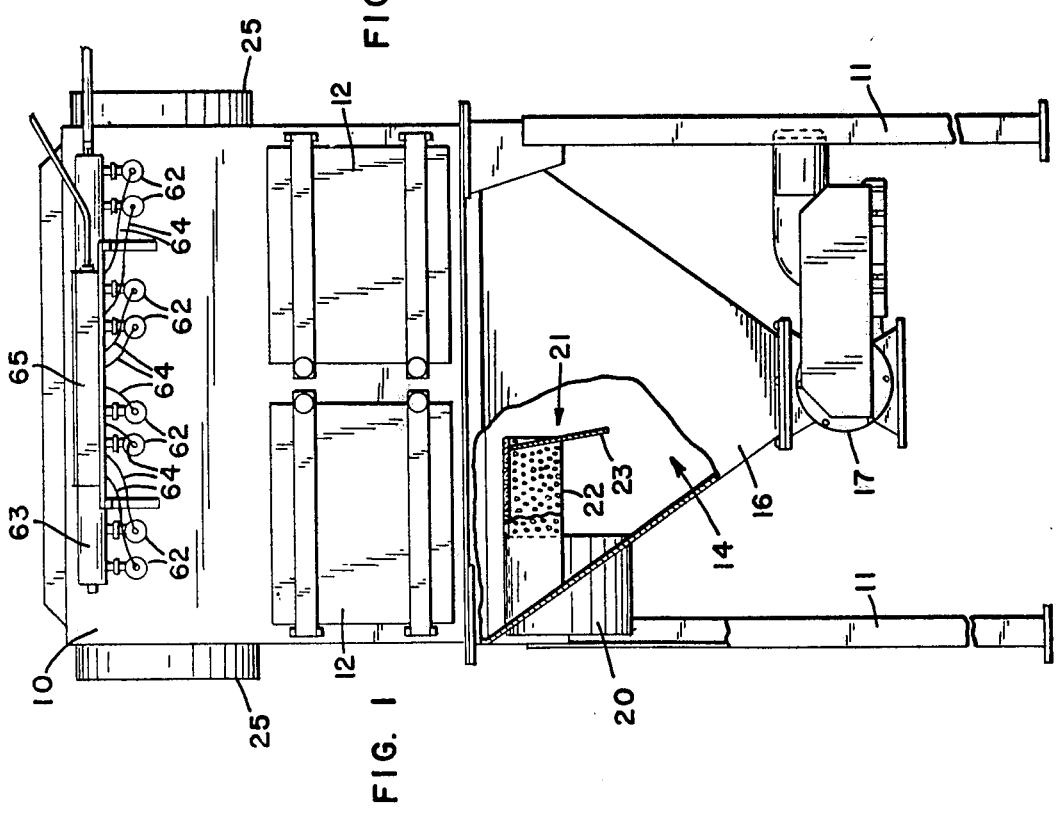
FIG. 2 is a similar side elevation.
Figure 3:
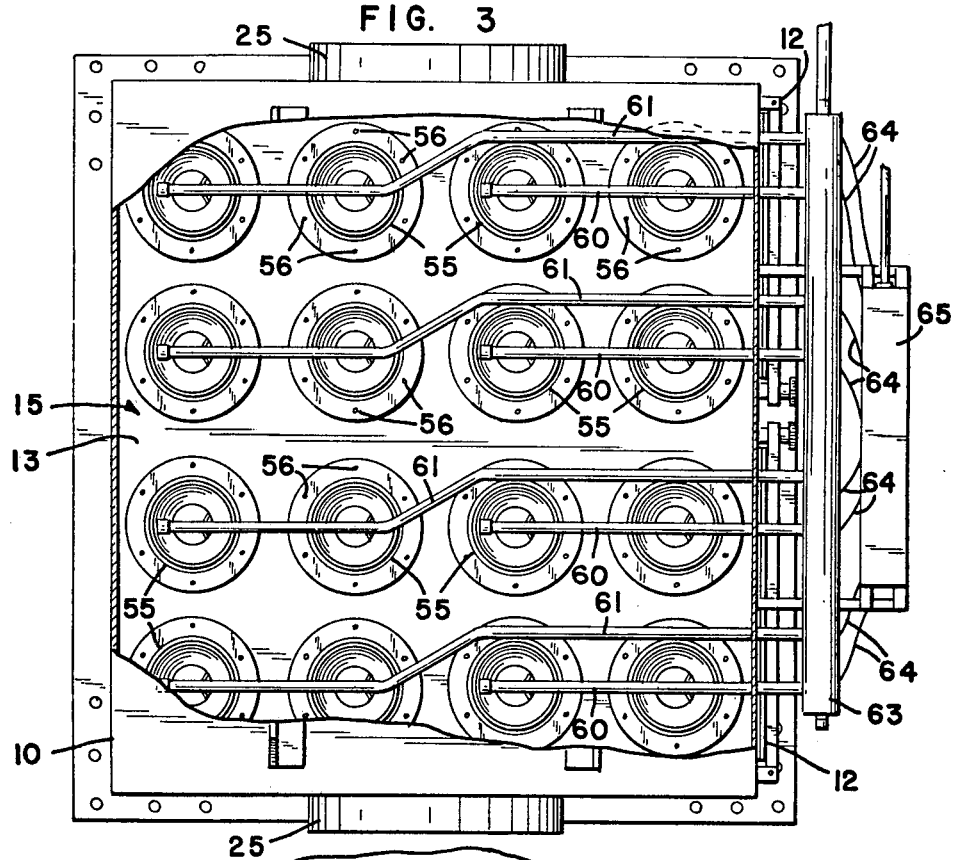
FIG. 3 is a similar plan view.

Turning now to FIGS. 1-3, a filter according to the invention is shown to comprise a housing 10 mounted on suitable legs 11 and provided with access doors 12. The housing is divided by a horizontal partition or wall 13 into an inlet chamber or plenum 14 and a clean air chamber or plenum 15. The lower portion of chamber 14 is formed as a hopper 16, having at its bottom a discharge valve 17 of the usual type which may be driven by a suitable motor. The air containing particulate matter is admitted to chamber 14 at an inlet 20 which includes a deflector 21 made up of a semi-cylinder 22 of perforated metal carrying at its end a disc 23 of imperforate metal preferably arranged at an angle of about seventy-seven degrees with respect to the longitudinal axis of the inlet. The perforations in semi-cylinder 22 may conveniently be half an inch in diameter and may occupy about fifty percent of the area.

Partition 13 is shown as having an array of apertures 24 for passage of air from chamber 14 into chamber 15, from which it is removed through an outlet 25 which also serves to give access to chamber 15. Flow of air through the filter may be produced by a fan or a pump drawing the air from outlet 25, or forcing it into inlet 20, at the choice of the user. In one embodiment of the invention inlet 20 had a diameter of eighteen inches and outlet 25 had a diameter of twenty inches: for a flow of 6600 cubic feet per minute this resulted in inlet velocity of 3730 feet per minute and exhaust velocity of 3025 feet per minute.

Figure 5:
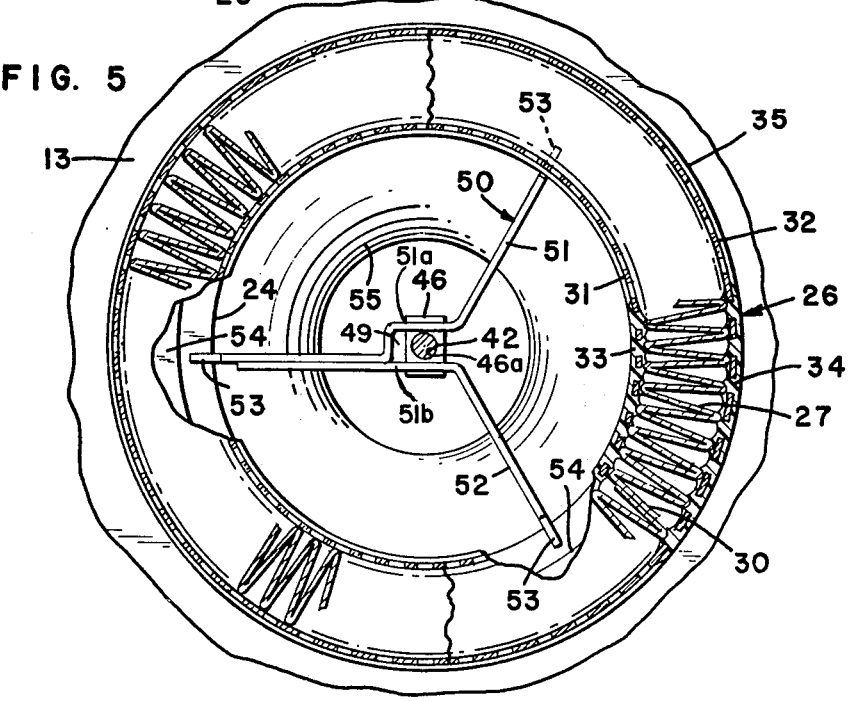
FIG. 5 is a fragmentary sectional view taken along the line 5—5 of FIG. 4.

Mounted in chamber 14 below the apertures in partition 13 is an array of pleated paper filter elements 26 derated by a factor of about four, and best shown in FIGS. 2, 4, and 5. To achieve the derating by a factor of about four, a plurality of pleated paper filters 26 having a total filter area sufficient to reduce the velocity of air flow therethrough to approximately one-quarter of the rated velocity of the filters 26, are installed in the apertures. Each filter element is shown to comprise a hollow cylinder 27 of pleated porous paper, which is the actual filter medium, having one closed end and one open end, the folds in the pleats running parallel to the longitudinal axis of the cylinder, and the first and last pleats being cemented or otherwise secured together as suggested at 30. Cylinder 27 is contained between an inner screen 31 and an outer screen 32, both of perforated metal. The inner folds of the pleats are secured to inner screen 31 at intervals of a few inches along the cylinder by beads of adhesive 33, and the outer folds are similarly secured to the outer screen 32 by beads 34. At one open end 27a of the element the screens and the pleats are secured to a ring 35 of imperforate material by adhesive 36, and at the opposite or other, closed end 27b the screens and the pleats are secured to a disc 37 by adhesive 40. Disc 37 closes the end of the filter element and has a central depression 41 which is apertured to pass a tie rod 42, one end 42a of which is secured to the disc by a pair of nuts 43 and 44 and suitable lock washers 45.

The free end 42b of tie rod 42 threadedly engages the transverse internally threaded aperature 46a of a barrel nut 46 which is received in notches 47 in the upper face 48 of a three legged spider 50 secured to the lower surface of partition 13 and centered in aperture 24. As shown in FIG. 5 the spider is an assembly of two members 51 and 52 spot welded together to form a generally Y-shaped unit having three legs which are welded on edge to partition 13. Near the center of the spider, where notches 47 for barrel nut 46 are located, members 51 and 52 are bent to define a smaller U-shaped opening 49, the legs 51a, 51b of which comprise central walls of the spider and are spaced by slightly more than the diameter of the tie rod 42. At their outer ends the legs of spider 50 are cut away as at 53 to fit within the inner screen 31. Associated with each aperture is an annulus 54 of compressible material such as rubber, which makes a seal between the partition and the adjacent open end of the filter element when the element, and therefore, rod 42, is screwed tightly into the barrel nut 46.

It will be seen that the path for air flow from chamber 14 to chamber 15 is radially inward through screens 32, cylinders 27 and screens 31 of the filter elements 26, then through the insides of these elements and past spiders 50. Dust and other particulate matter collects on the outer surfaces of the filter elements, and must periodically be removed to clean the elements and restore their efficiency.

The cleaning is accomplished by means, including an ejector pump having a venturi 55, associated with each aperture in partition 13. The venturis are located in chamber 15 and are secured to partition 13 in centered relation to the apertures by rivets 56. Spaced from and coaxial with the venturis are nozzles 57 through which short bursts or pulses of clean compressed air are projected as jets through the venturis into the filter elements in a predetermined, timed sequence. The nozzles may conveniently be no more than properly positioned radial holes in pipes extending laterally above the venturis.

It has been found that when sixteen filter elements are used, as indicated in FIG. 3, efficient system operation can be accomplished when two elements are cleaned at once, fourteen elements remaining in normal service. Accordingly, eight cleaning pipes 60, 61 extend into chamber 15 from a like number of solenoid valves 62 which may be energized to place the pipes in communication with a manifold 63 supplying air at 90-100 PSIG. Pipes 60 are short and straight, pausing directly over the centers of venturis near the manifold, and pipes 61 are longer and offset to pass directly over the centers of venturis remote from the manifold. Each pipe has two nozzles, properly located to supply jets to its associated venturis.

Valves 62 are connected by suitable electrical conductors 64 to a junction box 65 which contains or is suitably connected to a timer for energizing the valves in a predetermined sequence. It has been found that an electrical pulse fifty milliseconds long results in valve opening for about one-tenth of a second, and that the resulting air pulse of say ¾ SCPM is brief enough and abrupt enough to have the desired cleaning effect in the two filter elements. The valves are repeatedly operated in a predetermined order. It is a matter of choice, to be determined by the user, how often the cycle of operation of all eight valves takes place: they preferably operate at equal intervals, and the cycle length may vary between half a minute and eight minutes or more.

It must be emphasized that the derating factor of four used in specifying these filters is of an entirely different order of magnitude from the derating discussed earlier, and has no meaningful relation to the operation of the filters in their filtering functions: its magnitude is dictated instead of the strains put on the filter medium by the reverse jet cleaning procedure. So great a derating would be unjustified economically in a filter system of the type for which the pleated filters are originally designed, as it would extend the filter life long beyond the time within which it would require to be changed because of occlusion with particulate matter. The additional advantage of so gross a derating is present, however, that by reducing the velocity of the air passing through the filter the impact of particles with the filter is greatly reduced, so that the particles are more easily removed during the cleaning process, and so that fewer particles are forced entirely through the medium.

Although elements 26 are shown as of pleated paper, it will be understood that other fibrous materials, more especially non-woven materials such as felt, for example, may be used.

Numerous characteristics and advantages of the invention have been set forth in the foregoing description, together with details of the structure and function of the invention, and the novel features thereof are pointed out in the appended claims. The disclosure, however is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A filter comprising, in combination:
   a housing;
   a partition dividing said housing into first and second chambers and having a plurality of apertures;
   a like plurality of filter elements, each element comprising
   (a) a hollow cylinder of pleated, porous paper arranged with the folds between the pleats parallel to a longitudinal axis extending between first and second ends of the cylinder,
   (b) an inner screen of perforate material secured at axially spaced intervals to the inner folds of the pleats,
   (c) an outer screen of perforate material secured at axially spaced intervals to the outer folds of the pleats,
   (d) a ring of imperforate material secured to the screens at said first end of the cylinder, and
   (e) a disk of imperforate material secured to the screens at said second end of the cylinder, all whereby to prevent any significant movement of the porous paper in the element and to maintain the rigidity and effective filtering area of the element;
   means removably mounting said filter elements in the first chamber, in said apertures in said partition, said means comprising
   (a) compressible members surrounding said apertures between said partition and said elements,
   (b) a like plurality of spiders secured to the partition, each spider being centered on an aperture, each spider including a pair of spaced central walls having aligned central notches on the face of said spider remote from the first chamber,
   (c) tie rods having first ends secured to the centers of the disks of the filter elements, and having second ends which extend inwardly through the elements and project beyond the first ends of said cylinders, and
   (d) barrel nuts threadedly engaging said rods at the second ends thereof, to be received in the notches of the spiders when the tie rods pass between the central walls thereof, whereby rotation of a filter element about its axis causes linear movement of said element with respect to the partition into axial sealing engagement with a compressible member,
   means, enabling ingress of air laden with particulate matter to the first chamber;
   means enabling egress of air from the second chamber, whereby air normally flows radially through said elements and said particulate matter collects on the surfaces of said elements; and
   means including a nozzle and a venturi in the second chamber aligned with each aperture for providing brief pulses of air to said elements in a predetermined sequence, in a direction opposite to that of the normal air flow, to release from the surfaces of said element the matter collected thereon.

2. Apparatus according to claim 1 in which the pair of spaced central walls of each spider comprise the opposite legs of a generally U-shaped structure having one open end, and the space between the walls is no less than the diameter of the tie rod, so that said tie rod may be passed laterally into the space until the barrel nut is aligned with said notches.

3. A filter comprising, in combination:
   a housing;
   a partition dividing said housing into first and second chambers, and having a plurality of apertures;
   a like plurality of cylindrical pleated paper filter elements, each element having an open end and an opposite end closed with an imperforate disk;
   means removably mounting said filter elements in the first chamber, with said open ends in communication with said apertures, at least one of said means comprising a spider secured to said partition and centered on one of said apertures and including a pair of spaced central walls having aligned notches on the face of said spider remote from the first chamber, a tie rod fastened to said disk of one of said elements and having a free end projecting axially through said open end thereof beyond the element, and a barrel nut threadedly engaging said tie rod at said free end thereof, to be received in said notches when said tie rod is passed transversely between said central walls to suspend said element therefrom by said tie rod;
   means enabling ingress of air laden with particulate matter to the first chamber;
   means enabling egress of air from the second chamber, whereby air normally flows through said elements and said matter collects on the surfaces of said elements; and means including a nozzle and a venturi in the second chamber aligned with each aperture for providing brief pulses of air to said elements in a predetermined sequence, in a direction opposite to that of the normal air flow, to release from the surfaces of said elements the matter collected thereon.

4. In an air filter, in combination:

a chamber, having an outlet aperture and a wall with an inlet aperture for enabling a normal flow of air therethrough;

a hollow porous filter element having a longitudinal axis and an open end;

filter element mounting means carried in part by said element and in part by said wall, including a first threaded member removably fixed to said element for rotation therewith about the axis thereof, a second threaded member engaging said first threaded member for relative linear and rotary movement thereon, and connection means secured in said inlet aperture for removably receiving said second threaded member and preventing rotation thereof about said axis and preventing axial movement thereof in at least one direction, so that upon rotation of said filter element in one direction said open end is drawn toward said wall, all whereby in the course of said normal flow through said chamber airborne particulate matter collects on an outer surface of said element; and means in said chamber for directing intermittent pulses of air at high pressure into said filter element through said inlet aperture, to periodically remove matter collected on the surface of said filter element.

5. A structure according to claim 4 in which said first threaded member comprises an externally threaded rod extending beyond the open end of said filter element.

6. A structure according to claim 4 in which one end of said filter element is closed and said first threaded member comprises an externally threaded rod secured to the closed end of said filter element and extending through said filter element beyond the open end thereof.

7. A structure according to claim 4 in which said second threaded member comprises a barrel nut having a transverse internally threaded aperture.

8. A structure according to claim 4 in which said connection means comprises a spider having legs which define a generally central U-shaped opening and include a pair of spaced aligned transverse notches.

9. A structure according to claim 4 in which said second threaded member comprises a barrel nut having a transverse internally threaded aperture, and in which said connection means comprises a spider having legs which define a generally U-shaped opening and include a pair of spaced aligned transverse notches.

10. A structure according to claim 4 in which said first threaded member comprises an externally threaded rod extending beyond the open end of said filter element, and in which said second threaded member comprises a barrel nut having a transverse internally threaded aperture.

11. A structure according to claim 4 in which said first threaded member comprises an externally threaded rod extending beyond the open end of said filter element, said second threaded member comprises a barrel nut having a transverse internally threaded aperture, and said connection means comprises a spider having legs which define a generally U-shaped opening and include a pair of spaced aligned transverse notches therein, so that said rod may pass through said U-shaped opening and said barrel nut may rest in said notches.

* * * * *

UNITED STATES PATENT AND TRADEMARK OFFICE
CERTIFICATE OF CORRECTION

PATENT NO. : 4,209,310
DATED : June 24, 1980
INVENTOR(S) : James L. Berkhoel

It is certified that error appears in the above-identified patent and that said Letters Patent are hereby corrected as shown below:

IN THE ABSTRACT

Line 3, after "accessories" the following should be added: --The mounting includes a spider notched to receive a barrel nut, and a rod fixed to the filter element and threaded to be received in the barrel nut--

Column 5, line 3, "SCPM" should be --SCFM--;

Column 6, line 24, after the word "means" delete the comma.

Signed and Sealed this

Fourth Day of November 1980

[SEAL]

Attest:

SIDNEY A. DIAMOND

Attesting Officer

Commissioner of Patents and Trademark